United States Patent [19]
Adomeit

[11] 4,181,273
[45] * Jan. 1, 1980

[54] AUTOMATIC RAPID LOCK BELT ROLL-UP CLAMP FOR SAFETY BELTS

[76] Inventor: Heinz-Dieter Adomeit, Knesbeckstr, 1000 Berlin 12, Fed. Rep. of Germany

[*] Notice: The portion of the term of this patent subsequent to Oct. 17, 1995, has been disclaimed.

[21] Appl. No.: 879,539

[22] Filed: Feb. 21, 1978

Related U.S. Application Data

[63] Continuation of Ser. No. 696,001, Jun. 14, 1976, abandoned.

[51] Int. Cl.$^2$ .................... A62B 35/00; B65H 75/48
[52] U.S. Cl. ................................ 242/107.2; 297/478
[58] Field of Search ....... 242/107.2, 107.4 R–107.4 E, 242/75.2; 297/388, 385–387, 389; 280/744–747; 188/65.1, 72.9, 188

[56] References Cited
U.S. PATENT DOCUMENTS

| | | | |
|---|---|---|---|
| 3,389,874 | 6/1968 | Van Noord | 242/107.2 |
| 3,692,253 | 9/1972 | Curran | 242/107.4 R |
| 3,817,473 | 6/1974 | Board et al. | 242/107.2 |
| 3,847,434 | 11/1974 | Weman | 242/107.2 |
| 4,120,466 | 10/1978 | Adomeit | 242/107.2 |

Primary Examiner—John M. Jillions
Attorney, Agent, or Firm—Roger H. Criss; Patrick L. Henry

[57] ABSTRACT

An automatic, rapid lock, belt roll-up clamp for vehicle safety belts is provided with a belt clamp disposed behind a winding drum. The belt is adapted to be guided with minimal friction between first and second guide points located next to a clamp lever having a joint, and between two clamping surfaces, one of which is attached to a housing, the other of which is located on the clamp lever and both of which are substantially parallel to one another when in contact. The second guide point is pivotally mounted on the housing and located separately from the clamp lever and in front of the clamping surfaces with respect to the direction of belt pull. Clamping occurs by essentially pure normal force produced by pulling action at the first guide point, located on the clamp lever. At substantially completely filled condition of the winding drum, the moving way of the belt between guide points is the same as the moving way between the second guide point and the winding drum.

3 Claims, 2 Drawing Figures

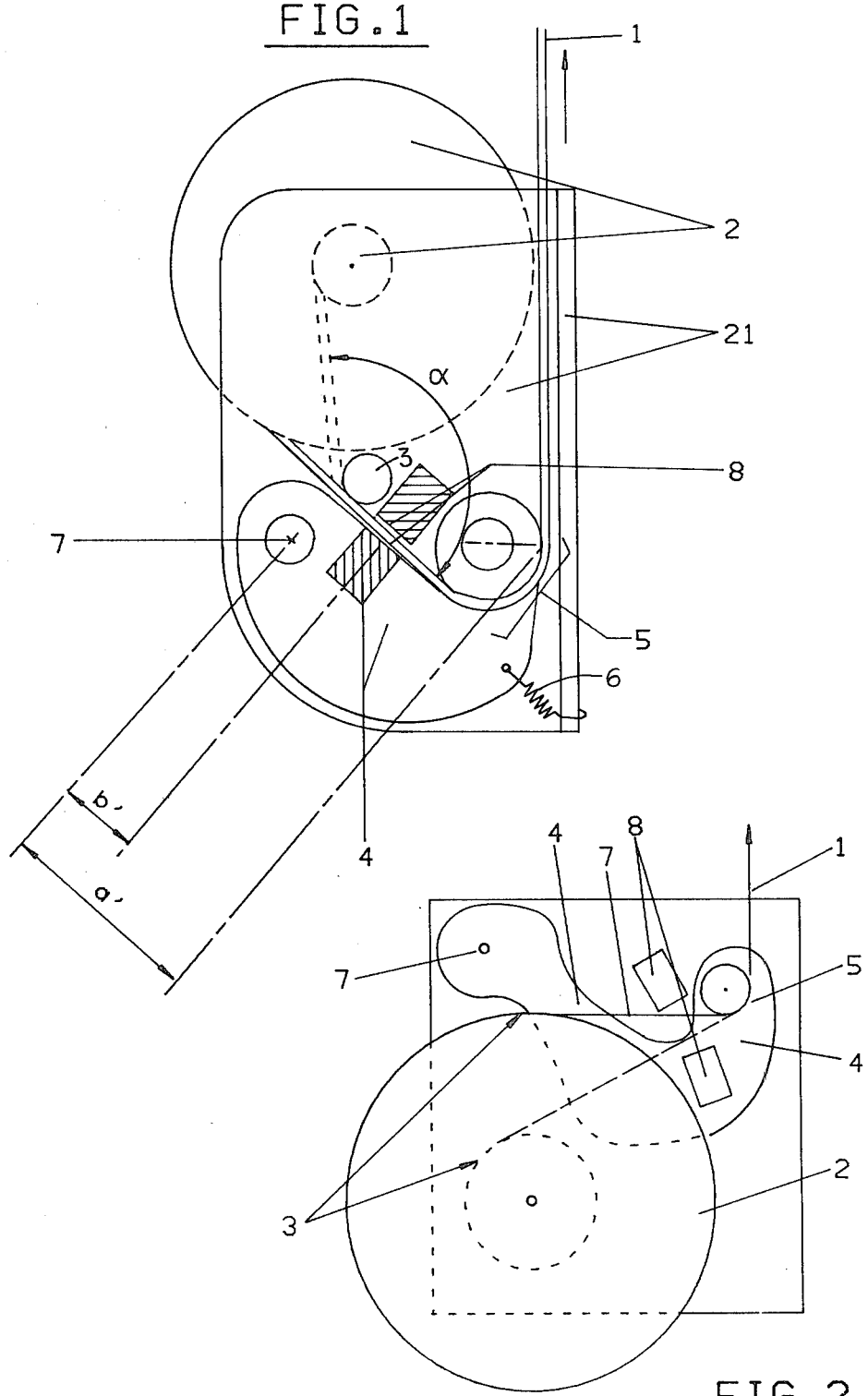

AUTOMATIC RAPID LOCK BELT ROLL-UP CLAMP FOR SAFETY BELTS

This is a continuation, of application Ser. No. 696,001, filed June 14, 1976 now abandoned.

BACKGROUND OF THE INVENTION

1. Field of the Invention

This invention relates to retractors for motor vehicle safety belts and more particularly to an automatic, rapid lock belt roll-up clamp in which the belt clamp is disposed behind a winding drum and the belt is adapted to be guided with minimal friction, between guide points and clamping surfaces until being clamped by pulling action at one of the guide points.

2. Description of the Prior Art

An automatic, rapid-lock belt roll-up clamp of the type upon which this invention has improved is described in U.S. Pat. No. 4,120,466, which achieved in an advantageous way that the belt clamps safely, and is released again—after clamping —upon relief, without belt breaks occurring during clamping due to relative motion between belt and clamping surfaces and to clamping forces lateral to normal force direction. Although, with modern techniques, the friction of the belt at the guide points can be kept low, it is nevertheless higher than that considered to be desirable for commercial applications.

The present invention further reduces the friction at the guide points for the belt roll-up automatic clamp of the type previously mentioned to improve the comfort of the automatic clamp for the user.

SUMMARY OF THE INVENTION

The automatic, rapid lock, belt roll-up clamp of the present invention is disposed behind a winding drum. The belt is adapted to be guided with minimal friction between first and second guide points located next to a clamp lever having a joint, and between two clamping surfaces, one of which is attached to a housing, the other of which is located on the clamp lever and both of which are substantially parallel to one another when in contact. Clamping occurs by essentially pure normal force produced by pulling action at a guide point located on the clamp lever. The reduction in friction is achieved because the second guide point, preferably not displaceable and pivoting on the housing separately from the clamp lever, is intended to be in front of the clamping surfaces seen in the direction of the belt pull, so that the path of belt movement of the belt between the guide points runs in one direction with the path of belt movement between the non-displaceable guide point and the winding drum, when the winding drum is completely coiled up.

In a surprisingly simple way, one guide point can practically be eliminated in a certain working area, due to these characteristics, because the path of belt movement at that respective location, i.e. the location of the non-displaceable guide point does not change or change so little, i.e. such little guiding occurs that mentionable friction and belt strap bending is prevented. The mentioned "certain working area" that may be obtained with a completely coiledup winding drum, can be altered in accordance with the path of belt movement selected by a constructionally simple shifting of the guide point of the clamp lever towards the center of rotation of the winding drum in the housing such shifting of the clamp lever guide point approximately at the beginning of unwinding of the belt, if necessary, also at the end of the unwinding, prevent guiding at the non-displaceable guide point and causes the path of belt movement to be straight-lined before and after the non-displaceable guide point.

In an advantageous further development of the invention, the winding drum itself is the non-displaceable guide point. Herein, from the point of design, the "non-displaceable guide point" is eliminated.

The distance, at the clamping point, between the the path of belt movement at completely coiled-up winding drum and at completely unwound winding drum can be compensated in a constructionally simple way by placing the two clamping surfaces at a corresponding distance to each other.

Then again, if the distance between axis of the winding drum and the clamping point is selected to be relatively large, the distance of the two path of belt movement, in unwound and in coiled-up condition, will consequently be respectively small.

It is furthermore advantageous according to the invention, that the guiding points are placed as friction-free as technologically possible. The friction at the guide points is then small, making the forces resulting from guiding negligible, so that there will be improved comfort for the user of the new automatic locking belt roll-up clamp.

BRIEF DESCRIPTION OF THE DRAWINGS

Further advantages, characteristics, and possibilities of application of the submitted invention are offered in the following description in connection with the drawings.

FIG. 1 shows, schematically and partly in sectional drawing, a first preferred type model of the automatic clamp, with which the guiding of the belt strap is minimal when the winding drum is almost completely coiled-up; and FIG. 2 shows a different type model in which the winding drum itself is the non-displaceable guide point.

DESCRIPTION OF THE PREFERRED EMBODIMENTS

The belt strap 1 is taken from the winding drum 2, in the direction indicated by the arrow. It is pulled out of the automatic clamp in this direction. Substantial guiding is done at the displaceable guide point 5, attached to clamp lever 4, which can be, for example, a roller with ball-bearing.

Aside from the shaft for the winding drum 2, the housing 21 also has the joint 7 for the clamp lever 4 at a suitable point so that there is a sufficient lever arm between the joint 7 and the roller for the displaceable guide point 5. Approximately in the center the housing 21 bears a block with a clamping surface 8, with another clamping surface 8, attached to the clamp lever 4, opposite from it. These two clamping surfaces 8 are arranged to one another in such a way that they are parallel to one another during the clamping due to the pulling action at the displaceable guide point 5 by the belt strap 1. Seen in the direction of belt pull, in front of the clamping surfaces 8 in FIG. 1, the other, non-displaceable, pivoted guide point 3 on the housing is set so that the straight-lined path of belt movement, shown in the Figure on the right of the guide point 3 at completely coiled-up winding drum 2, will practically pass over into that one on the left from the guide point 3 without change of direction, i.e. the guide point 3 is "eliminated" so that friction and belt strap bending consequently does not occur at this point.

The more belt strap 1 unwinds from winding drum 2, the smaller the angle $\alpha$ becomes, whose minimal value however is still approximately 135° with completely unwound winding drum 2, according to the drawing.

Just as the previous suggestion, this belt roll-up automatic clamp also has the swinging clamp lever held by springs (or by one spring) in its resting position according to the only figure, so that a light belt roll-up, unwind movement is possible, the belt being passed frictionless between the two clamping surfaces. Clamping is done by upward tilting of the clamp lever 4 over the joint 7 against the force of the spring 6 and clamping the belt between the clamping surfaces 8. Clamping is done by pure normal force, effected by the motional kinematics of the lever-side clamping surface, the lever being designed with a leverage b'/a' so that, at the most, the clamping coefficient /$u_k$ of the respective pair belt-clamping surface is obtained. With the optimum leverage b/a, at respectively fixed clamping coefficient /$u_k$, the clamping normal force should remain as small as possible without the holding of the belt strap between the clamping surfaces being endangered. The belt strap webbing is treated gently with this normal force being kept at the lowest possible point.

With this new invention, especially the separation of guide point 3 and joint 7 of the clamp lever 4, freer design is guaranteed for the belt strap course from the winding drum 2 over the guiding point 3 between the clamping surfaces 8 through to guide point 5, and also guaranteed are lower belt pull forces due to the reduction of friction, caused by belt strap bending. According to the type model of FIG. 2, the non-displaceable guide point 3 is intended to be on the winding drum 2, i.e. such guide point 3 is the circumference of the drum 2.

The solid lines shown the path of belt movement of the belt strap with completely filled or fully coiled-up winding drum, whereas the inner smaller winding drum with dotted lines shows the unwound, or the nearly unwound condition. From the unwound winding drum 2 with small diameter the other moving way of the belt strap is shown in dotted lines to the displaceable guide point 5. Between these two path of belt movement, the one shown in solid lines, the other one in dotted lines, there is obviously a space at the point between the two clamping surfaces 8. This can be compensated for in a constructionally simple way by placing the two clamping surfaces 8 in a respective distance from one another, as it is shown in FIG. 2 in the type model shown there. On the other hand, if the distance between the axis of the winding drum 2 and the clamping point 8 is chosen sufficiently large, the previously mentioned distance between the two paths of belt movement at clamping point 8, that is between the path of belt movement shown in solid lines and that shown in dotted lines, i.e. in coiled-up and unwound state, will be accordingly small. In other words, FIG. 2 shows that the distance of the mentioned paths of belt movement decreases from another from the left to the right towards the guide point 5.

As according to FIG. 1 the belt strap pull direction is not vertical to the direction of course between tangential separation point of the belt on winding drum 2 and the guide point 5, but the two paths of belt movement rather enclose an angle of about 90° minus $\alpha$, the following holds, in comparison to the formulas according to U.S. Pat. No. 4,120,466

$$b = b' \times \cos \alpha$$

$$a = a' \times \cos \alpha$$

according to FIG. 1 b' is measured as the distance between the lever joint 7 up to the center line of the clamping surfaces 8, and a' is measured as the distance from the lever joint to the tangential separation point of the belt strap at the guide point 5. In the constructional development of the belt roll-up automatic clamp according to the invention, the two relations above should not be disregarded, which result with regard to the lever setting with angle $\alpha$ to the direction of belt pull.

I claim:
1. A vehicle safety belt retractor, comprising:
   a. a housing;
   b. a winding drum being rotatably mounted on said housing;
   c. belt means attached to said winding drum for protraction and retraction with respect thereto;
   d. clamp means for clamping said belt to prevent sudden protraction thereof, said clamp means including:
      (i) a first fixed planar clamping surface;
      (ii) a lever pivotally mounted at one end thereof; and
      (iii) a second displaceable planar clamping surface carried by the intermediate portion of said lever for movement from a rest position toward said fixed clamping surface to clamp the belt therebetween;
   e. resilient means coupled to said lever for biasing said lever for movement about its pivot in a direction to urge the second clamping surface carried by said lever away from said first clamping surface;
   f. first guide means mounted adjacent said one end of said lever for guiding said belt means;
   g. second, displaceable, guide means carried by the other end of said lever for entrainment of said belt means thereabout, and operating in response to preselected abnormal tension of said belt to pivot said lever and thereby move said second clamping surface toward said first clamping surface;
   said belt means normally extending off said winding drum to said first guide means, past said pivot, thence between said clamping surfaces without contact therewith and thence over said second guide means whereby in normal operation the retractor allows always free winding and unwinding of the belt between said clamping surfaces without contact therewith, but where a predetermined abnormal tension on the belt applies a force to said lever via the second guide means to actuate said lever into its clamping position against the bias of said resilient means in a substantially normal direction with no wedging action, said planar clamping surfaces being substantially parallel to the plane of the web at the point of contact therewith;
   h. said first and second guide means being so located on the housing relative to said clamping surfaces and the winding drum, such that the belt follows essentially a straight path between the periphery of the winding drum to the second guide means when the belt is retracted.
2. A vehicle safety belt retractor, comprising:
   a. a housing;
   b. a winding drum being rotatably mounted on said housing;

c. belt means attached to said winding drum for protraction and retraction with respect thereto;
d. clamp means for clamping said belt to prevent sudden protraction thereof, said clamp means including
   (i) a first fixed planar clamping surface carried by said housing;
   (ii) a lever pivotally mounted at one end thereof on said housing; and
   (iii) a second displaceable planar clamping surface carried by the intermediate portion of said lever for movement from a rest position toward said fixed clamping surface to clamp the belt therebetween;
e. resilient means coupled to said lever for biasing said lever for movement about its pivot in a direction to move the second clamping surface carried by said lever away from said first clamping surface;
f. first guide means carried by said housing for guiding said belt means;
g. second, displaceable, guide means carried by the other end of said lever for entrainment of said belt means thereabout, and operating in response to preselected abnormal tension of said belt to pivot said lever and thereby move said second clamping surface toward said first clamping surface;
said belt means normally extending off said winding drum to said first guide means, past said pivot, thence between said clamping surfaces without contacting same and thence over said second guide means whereby in normal operation the retractor allows always free winding and unwinding of the belt between said clamping surfaces without contact therewith, but where a predetermined abnormal tension on the belt applies a force substantially perpendicular to said lever to actuate said lever into its clamping position against the bias of said resilient means in a substantially normal direction with no wedging action, said planar clamping surfaces being substantially parallel to the plane of the web at the point of contact therewith;
said belt in its operative condition extending away from said second guide means in a direction substantially perpendicular to its path as it approaches said guide means;
h. said first and second guide means being so located on the housing relative to said clamping surfaces and the winding drum, such that the belt follows essentially a straight path between the perhiphery of the winding drum to the second guide means when the belt is retracted.

3. A vehicle safety belt retractor, comprising:
a. a housing;
b. a winding drum being rotatably mounted on said housing;
c. belt means attached to said winding drum for protraction and retraction with respect thereto;
d. clamp means for clamping said belt to prevent sudden protraction thereof, said clamp means including:
   (i) a first fixed planar clamping surface;
   (ii) a lever pivotally mounted at one end thereof; and
   (iii) a second displaceable planar clamping surface carried by the intermediate portion of said lever for movement from a rest position toward said fixed clamping surface to clamp the belt therebetween;
e. resilient means coupled to said lever for biasing said lever for movement about its pivot in a direction to urge the second clamping surface carried by said lever away from said first clamping surface;
f. guide means for guiding said belt means, said guide means including displaceable means carried by the other end of said lever for entrainment of said belt means thereabout, and operating in response to preselected abnormal tension of said belt to pivot said lever and thereby move said second clamping surface toward said first clamping surface;
said belt means normally extending off said winding drum past said pivot, thence between said clamping surfaces without contact therewith and thence over said displaceable means whereby in normal operation the retractor allows always free winding and unwinding of the belt between said clamping surfaces without contact therewith, but where a predetermined abnormal tension on the belt applies a force to said lever via the displaceable means to actuate said lever into its clamping position against the bias of said resilient means in a substantially normal direction with no wedging action, said planar clamping surfaces being substantially parallel to the plane of the web at the point of contact therewith; and
g. a first guide point located at the point where said belt leaves said winding means and a second guide point at said displaceable means, said guide means being so located on the housing relative to said clamping surfaces and the winding drum, such that the belt follows essentially a straight path between said first and second guide points when the belt is retracted.

* * * * *